Sept. 15, 1964 L. A. WARD 3,149,321

KEY APPARATUS FOR PREDETERMINED SEQUENTIAL ENGAGEMENT WITH A PLURALITY OF LOCKS

Filed April 26, 1960 5 Sheets-Sheet 1

INVENTOR.
LESLIE A. WARD

BY Alfred C. Body

ATTORNEY

Sept. 15, 1964 L. A. WARD 3,149,321

KEY APPARATUS FOR PREDETERMINED SEQUENTIAL ENGAGEMENT WITH A PLURALITY OF LOCKS

Filed April 26, 1960 5 Sheets-Sheet 2

INVENTOR.
LESLIE A. WARD
BY Alfred C Body
ATTORNEY

Sept. 15, 1964 L. A. WARD 3,149,321

KEY APPARATUS FOR PREDETERMINED SEQUENTIAL ENGAGEMENT WITH A PLURALITY OF LOCKS

Filed April 26, 1960 5 Sheets-Sheet 3

INVENTOR.
LESLIE A. WARD
BY Alfred C. Body
ATTORNEY

INVENTOR.
LESLIE A. WARD
BY Alfred C. Body
ATTORNEY

Sept. 15, 1964 L. A. WARD 3,149,321
KEY APPARATUS FOR PREDETERMINED SEQUENTIAL
ENGAGEMENT WITH A PLURALITY OF LOCKS
Filed April 26, 1960 5 Sheets-Sheet 5

INVENTOR.
LESLIE A. WARD
BY Alfred C Body
ATTORNEY

United States Patent Office 3,149,321

Patented Sept. 15, 1964

3,149,321

KEY APPARATUS FOR PREDETERMINED SEQUENTIAL ENGAGEMENT WITH A PLURALITY OF LOCKS

Leslie A. Ward, Cleveland, Ohio, assignor to Morse Signal Devices, Inc., Cleveland, Ohio, a corporation of Ohio Filed Apr. 26, 1960, Ser. No. 24,747
10 Claims. (Cl. 340—306)

This invention relates to compulsory tour signalling systems for watchmen wherein it is desired to have the watchmen visit a plurality of stations in accordance with a predetermined route pattern, and more particularly, to a relatively simple and tamper-proof system of this type.

It has heretofore been suggested in signalling systems of this type to provide a plurality of non-wired or dummy stations and one or more signal transmitter stations, all located at selected spaced locations throughout the area to be protected. The watchmen carried a combination key and lock (hereinafter called a key-lock) which, if he inserted in the various stations in a predetermined order ultimately actuated the signal transmitter to send an O.K. signal back to a central manned control station. Thus each dummy station contained a key which reset the lock so that it could be reset only by the key in the next predetermined station and so forth until the tour was completed. If the tour was completed in the proper order, the key-lock then could serve as a key to actuate the signal transmitter. However, the key-locks used heretofore had radially movable tumblers, and unless very bulky, were limited to use with a relatively small number of stations and the means at each non-wired station adapted to actuate the key-lock was relatively complicated and expensive. In some cases, the system was not fool-proof or tamper-proof and it was possible to bypass a station or visit the stations in undesired sequence while rendering the key-lock effective to transmit a signal at the transmitter station.

I have devised improved and relatively simple means obviating the aforementioned disadvantages.

In accordance with the present invention, a somewhat similar arrangement is provided but the key-lock includes a body and a member relatively rotatable thereto which carry a plurality of sets of aligned longitudinally movable tumblers so arranged that when engaged with an appropriate key, the member and body may be rotated relative to each other through a predetermined arc to reset the lock for operation by a different key.

Also in accordance with the invention, the key-lock may include a body and two or more members relatively rotatable to each other and to the body. Such members and body each carry a plurality of longitudinally movable tumblers, arranged so that when engaged with one plug-key, one of the members may be relatively rotated to the other member and the body or when engaged with a different plug-key, both of the members may be relatively rotated relative to the body in either case to preset the lock to be actuated by a different key. The number of stations which a given key-lock may serve is thus equal to the number of sets of tumblers raised to the power of the number of members, e.g., two members and nine sets of tumblers can service $9^2$ or 81 stations.

Further in accordance with the invention, the key-lock includes a key engageable with a lock at each transmitter station to actuate the signal transmitter. The number of stations which such a key-lock may serve is thus increased by the number of sets of tumblers in the transmitter station lock.

It is a primary object of the invention to provide in a compulsory route-type signalling system for watchmen comprising a plurality of non-wired stations and at least one wired transmitter station, improved means for insuring a visit to each non-wired station in accordance with a predetermined route pattern prior to actuating mechanism at the transmitter station to send a signal indicating completion of the route.

Another object of the invention is to provide improved means as set forth in the preceding object comprising a key-lock carried by the watchman and operable successively to a large number of different positions by differently formed keys, whereby with a key disposed at each station, a large number of stations can be visited by a watchman carrying a single key-lock without duplication of the keys.

Another object of the invention is to provide improved means as set forth in the primary object and wherein the improved means is also adapted to effect a signal from an emergency transmitter stationed disposed along the said route without disturbing the normal sequential operation of said means.

Another object of the invention is to provide improved means as set forth in the preceding objects which are relatively simple and inexpensive to manufacture.

The invention takes physical form in certain parts and arrangement of parts, the preferred embodiment of which will be described in this specification and illustrated in accompanying drawings which forms a part hereof and wherein.

Figure 1:
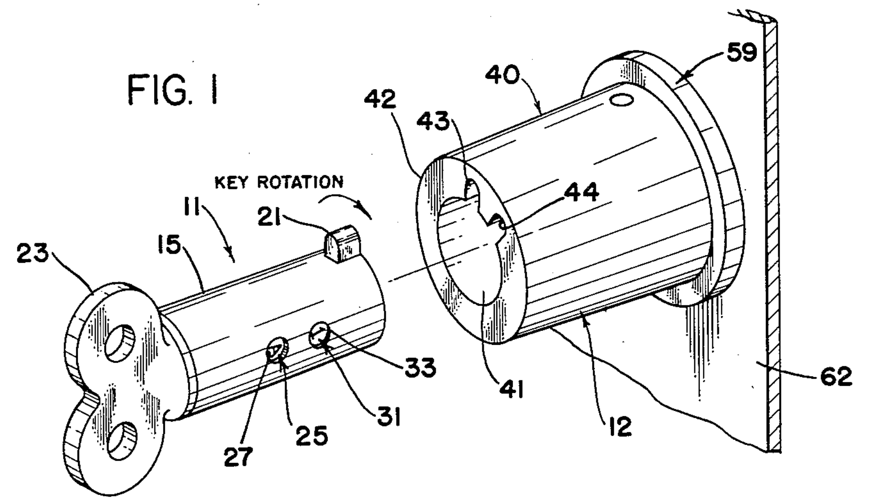
FIGURE 1 is an exploded perspective view showing the key-lock I preferably employ in position to engage a typical non-wired or dummy station.
Figure 2:
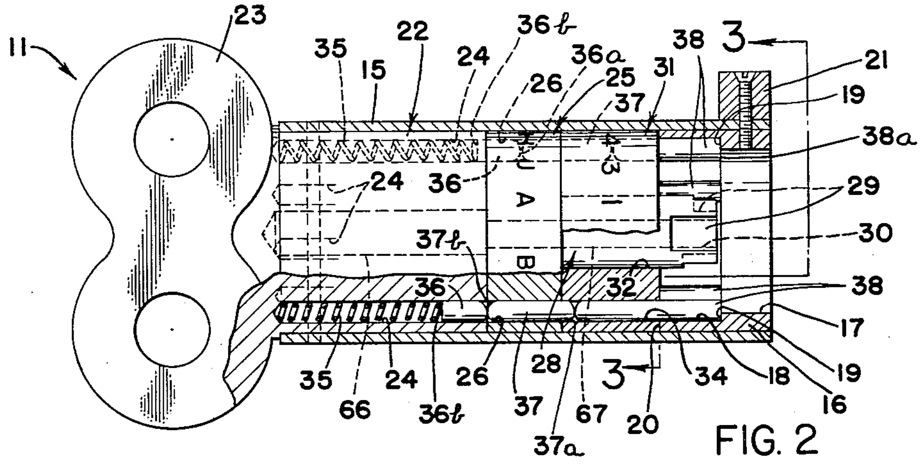
FIGURE 2 is an enlarged, fragmentary longitudinal, section showing the interior mechanism of the key-lock illustrated in FIGURE 1.
Figure 3:
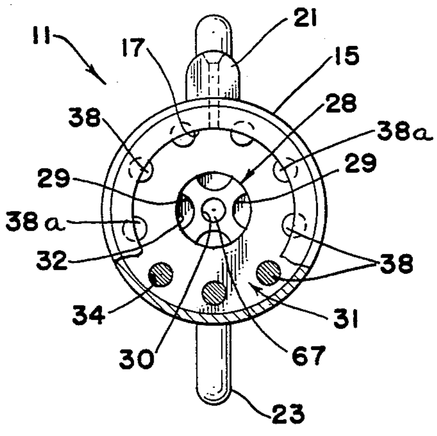
FIGURE 3 is a view, partially in transverse section, taken along the line 3—3 of FIGURE 2.

Referring now to the drawings wherein the showings are for the purposes of illustrating preferred embodiments of the invention only, and not for the purpose of limiting same, FIGURE 1 shows a key-lock generally indicated at 11 which is adapted to be inserted in a non-wired or dummy station generally indicated at 12 or into a transmitter station generally shown in FIGURES 9–13 to engage a key 50. If the key and lock match, the key-lock may be rotated in a clockwise direction and the lock reset to match a different key 50 at the next station. The dummy station 12 shown in FIGURE 1 is typical of a plurality of such stations which may be located at various selected points throughout the area to be protected.

*Key-Lock*

The key-lock 11 may take a number of different forms but in accordance with the embodiments shown, it includes an elongated cylindrical tube 15 having a generally cylindrical fitting or insert 16 brazed to the front end thereof. This fitting 16 is formed with a cylindrical bore 17 extending from its front end and a cylindrical counterbore 18 extending from the back end. At the juncture between the more 17 and the counterbore 18 the fitting 16 presents an internal annular shoulder or lip 19. At its back end the fitting 16 presents an annular shoulder 20 disposed within the bore of the tube 15. A nose 21 is brazed to the front end of the tube 15 at the top thereof.

At the back end of the tube 15 there is provided a body member having a cylindrical portion 22 disposed inside the tube 15 and a transversely extending handle 23 disposed outside of the tube 15. The portion 22 is fixedly secured to the tube 15 in any suitable manner. In the particular embodiment illustrated in the accompanying drawing, the portion 22 is formed with nine elongated cylindrical passages 24. Obviously, more or less passages could be provided. Each of these passages is closed at the outer or back end of the member and is open at the inner or front end thereof. The passages 24 are spaced apart circumferentially at 40 degree intervals about the axis of the member and extend lengthwise parallel to that axis.

Abutting the front end of the member portion 22 is a cylindrical letter wheel 25 which is rotatably mounted in the tube 15. This letter wheel is formed with lengthwise passages 26 of the same number spacing and location as the passages 24. At 40 degree intervals on its periphery, the letter wheel is provided with letters from "A" to "H" inclusive and "J." At one side the tube 15 is formed with an opening 27 which serves as a window through which one of these nine letters on the letter wheel is visible, depending upon the angular position of the letter wheel inside the tube.

The letter wheel 25 is provided with a key 28 in the form of an integral reduced diameter hub which projects forwardly from the cylindrical portion of the letter wheel. At its front end this key 28 has a plurality, in this case four, grooves 29 which are open at the front end of the hub and which extend to different depths rearwardly from the front end of the hub. These grooves 29 are disposed at 90 degree intervals circumferentially around the hub 28. An axial passage 30 extends lengthwise through the key 28 and the letter wheel 25. The key 28 serves to actuate the transmitter stations as will appear hereinafter.

An annular number wheel 31 is rotatably mounted within tube 15 on the key 28 just forward of the main cylindrical portion 25 of the letter wheel. The number wheel has a central bore 32 which receives the letter wheel key 28. The number wheel has a cylindrical periphery marked with the numbers "1" to "9" inclusive, at 40 degree intervals around its circumference. The tube 15 is provided with a second opening 33 aligned with the previously mentioned opening 27 and serving as a window through which one of these numbers is visible, depending upon the angular position of the number wheel. The number wheel in this case is formed with nine lengthwise passages 34 which register with the respective passages 26 in the letter wheel. The front face of the number wheel is disposed just behind the annular shoulder 20 presented by the back end of the fitting 16 in the tube 15. The key 28 on the letter wheel projects forwardly beyond the number wheel to a location substantially even with the internal shoulder 19 in the tube fitting 16.

At each of the registering sets of passages 24, 26 and 34 formed in the portion 22, letter wheel 25 and number wheel 31, there is provided a spring and tumbler set. Each set includes a spring, a back tumbler, a middle tumbler and a front tumbler. In each set the compression coil spring 35 has the same normal length, the back tumbler 36 has the same length, and the middle tumbler 37 has the same length. The front tumblers 38 in the respective sets are of different lengths.

Each of the springs 35 is received in a corresponding one of the passages 24 in the portion 22, with the back end of the spring engaging the closed back end of this passage. In its normal uncompressed condition, each spring 35 has a length equal to the length of the passage 24 in which it is received.

Each of the back tumblers 36 is generally cylindrical, presenting a rounded front end face *36a*, and a flat back end face *36b*. Each back tumbler 36 is freely slidable with respect to its body passage 24 and a letter wheel passage 26. The length of each back tumbler 36 is less than the axial length of each passage 26 in the letter wheel.

Each middle tumbler 37 is generally cylindrical and is dimensioned to be freely slidable with respect to the corresponding passage 26 in the letter wheel and an aligned passage 34 in the number wheel. Each middle tumbler 37 is provided with a rounded front end face *37a* and a rounded back end face *37b*. Each of the middle tumblers 37 has a length which is somewhat greater than the axial length of the corresponding passage 26 in the letter wheel.

Figures 4, 5, 6:
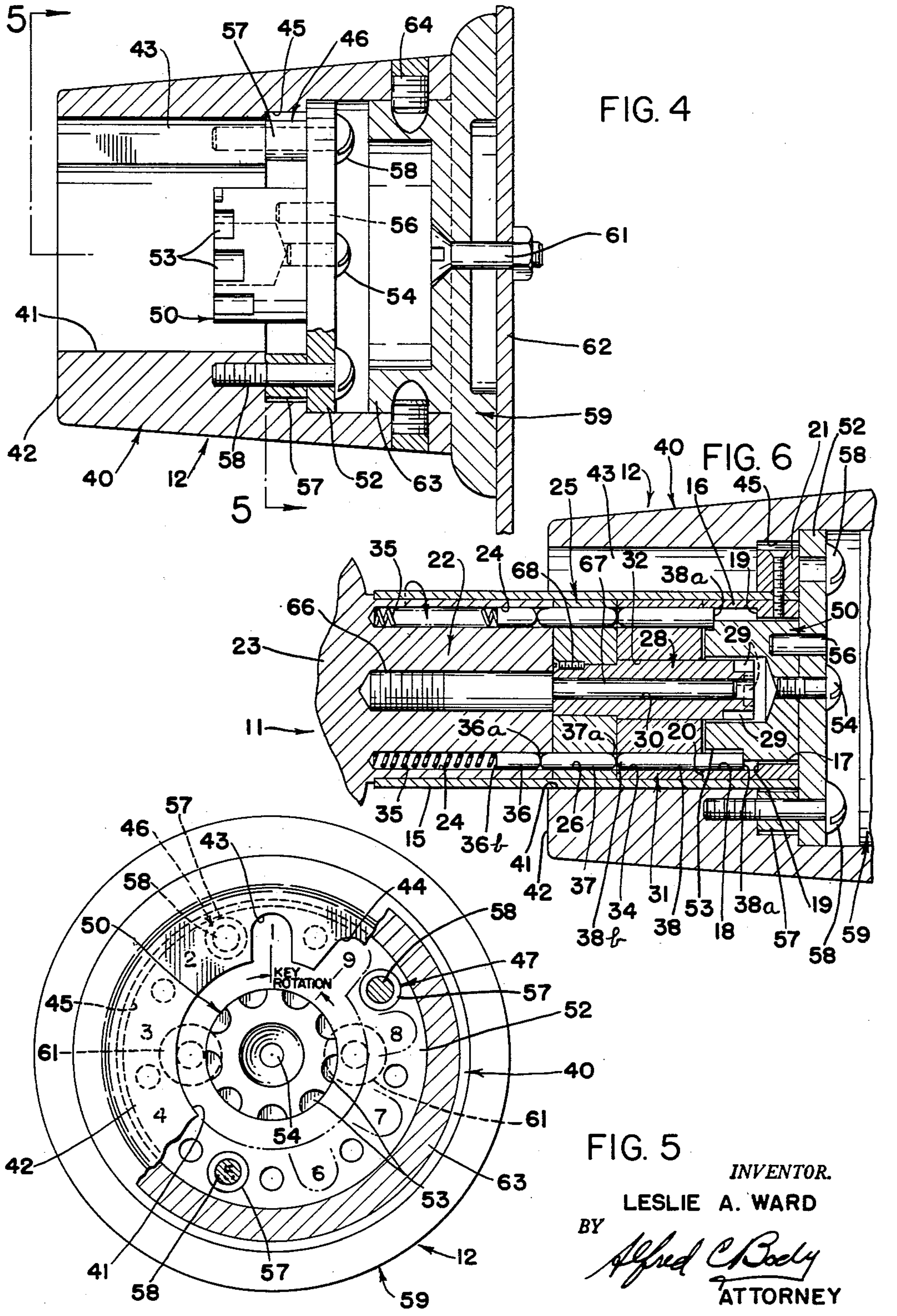
FIGURE 4 is a longitudinal sectional view of the non-wired station illustrated in FIGURE 1.
FIGURE 5 is a view, partially in transverse section, taken along the line 5—5 of FIGURE 4.
FIGURE 6 is a fragmentary longitudinal sectional view showing the key-lock partially telescoped within a non-wired station and engaging a plug type key.
Figures 7, 8:
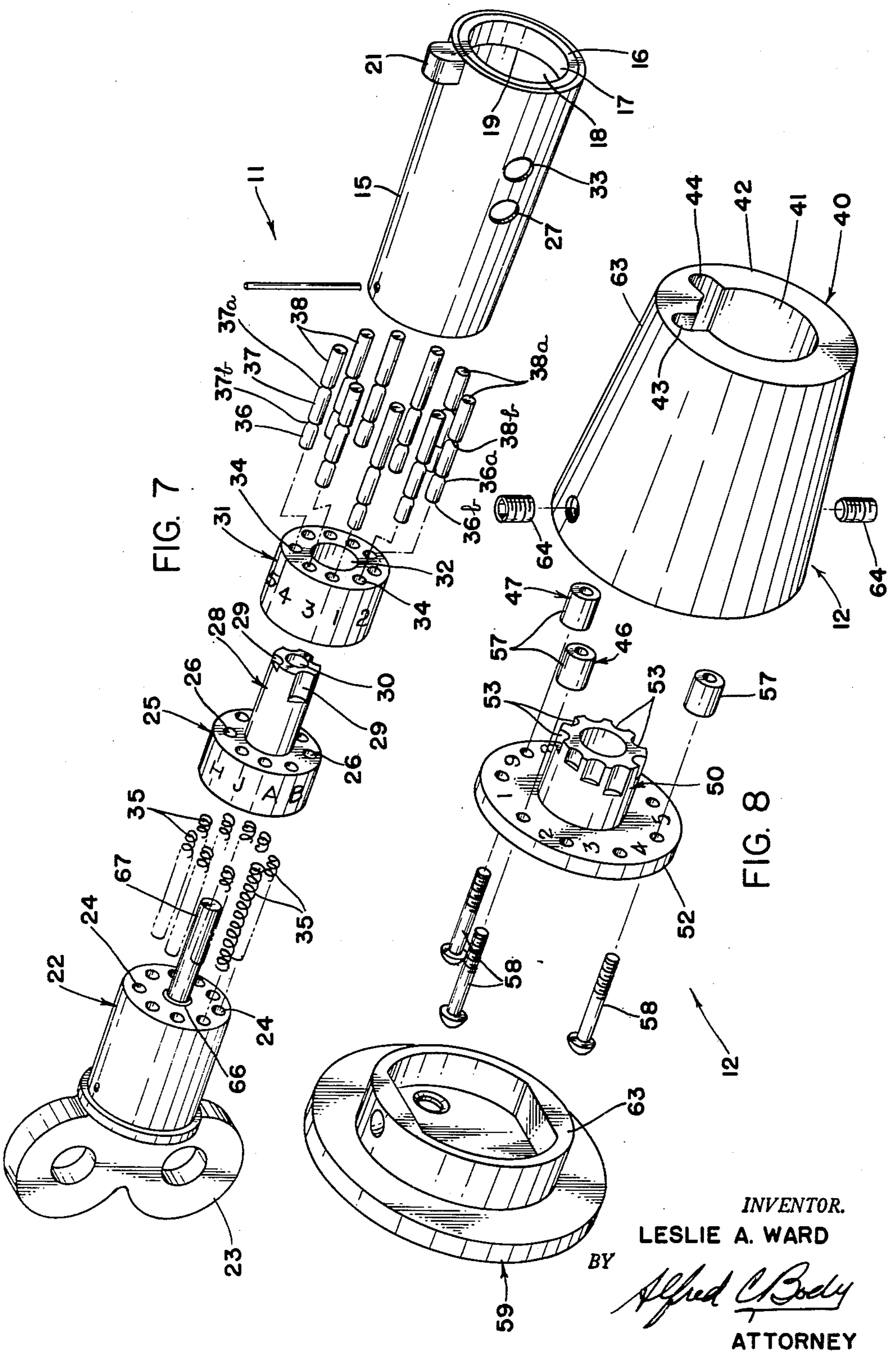
FIGURE 7 is an exploded view showing the various parts of the key-lock.
FIGURE 8 is an exploded view showing the various parts of the non-wired or dummy station, including the plug-type key.

Each of the front tumblers 38 is cylindrical and is dimensioned to be freely slidable in the corresponding passage 34 in the number wheel. Each front tumbler 38 presents a rounded back end face *38b* and a flat front end face *38a*. As best shown in FIGURES 6 and 7, the front tumblers 38 are of four different lengths and each has a length greater than the axial length of the number wheel 31. Also, each of these front tumblers 38 has a length greater than the spacing between the front end of the number wheel 31 and the internal shoulder or lip 19 provided by the fitting 16 inside the tube 15 at the front end thereof.

In the normal position of the parts, the respective springs 35 bias the tumblers to positions in which the front end face of each front tumbler 38 engages, or is close to, the shoulder 19. Each of the front tumblers 38 at this time projects partly into the number wheel 31. Each of the middle tumblers 37 is disposed partly in the number wheel 31 and partly in the letter wheel 25. Each of the back tumblers 36 is disposed partly in the letter wheel and partly in the member portion 22. In this position of the parts the tumblers hold the letter wheel and the number wheel against rotation with respect to portion 22 and the tube 15, as well as holding these wheels against rotation with respect to each other.

It is obvious that more wheels can be used as desired, provided the tumblers are dimensioned and arranged so that when all the tumblers are depressed or forced inwardly the proper amount, all the wheels are free to rotate relative to body portion 22 and tube 15. Further, the tumblers would be arranged so that depressing the tumblers a lesser amount would selectively lock one or more wheels to body portion 22 while the remaining wheels would be free to rotate relative to portion 22 and to each other.

*Dummy Station*

Each dummy station 12 includes a key in the form of a plug for cooperation with the aforementioned key-lock in such a manner that, by inserting the key-lock in the dummy station and turning it, the number wheel on the key-lock, or both the number wheel and the letter wheel on the key-lock advance a predetermined amount so as to present a different number or letter and number at the window or windows of the key-lock. This new letter and number combination designates the next station which must be visited by the watchman in making his rounds.

Referring to FIGURES 1, 4, 5, 6 and 8, each dummy station comprises a body 40 having a cylindrical bore 41 which is open at the front end 42 of the body. This bore 41 is dimensioned to slidably receive the tube 15 of the key-lock 11.

At the periphery of the bore 41 there are provided a pair of angularly spaced slots 43 and 44, each of which is dimensioned to slidably pass the nose 21 on tube 15. The slot 43 is located in vertical position at the upper portion of the dummy station body 40. In the particular embodiment shown, the other slot 44 is located 40 degrees clockwise from the slot 43. However, it is to be understood that the second slot 44 may be at any desired multiple of 40 degrees away from the slot 43.

At the back end of the bore 41, the body is formed with an enlarged cylindrical counterbore 45. The back ends of the respective slots 43 and 44 communicate with this counterbore 45. As best shown in FIGURE 5, a stop in the form of a pin 46 is located in the counterbore 45 at the side of the slot 43 remote from the second slot 44. Also, a stop in the form of a similar pin 47 is located in the counterbore 45 at the side of the second slot 44 which is remote from the first slot 43.

With this arrangement, the key-lock may be slidably inserted into dummy station 12 or the body 40 thereof with the nose 21 on the key being slidably inserted along the slot 43. When the nose 21 on the key reaches the counterbore 45, the key may be turned clockwise until the key nose 21 registers with the second slot 44. The key cannot be turned in the opposite direction due to the stop pin 46, and it cannot be turned angularly more than the spacing between the station body slot 43 and 44 due to the presence of the stop pin 47. As already indicated, depending upon the operation desired, the second slot may be either 40 degrees, or 80 degrees, or 120 degrees, or 160 degrees, or any suitable angular position away from the slot 43 into which the nose of the key is first inserted.

In order to effect operation of the number wheel, or both the letter and number wheels, in the key-lock 11 when turned as described, the dummy station is provided with a code plug key designated generally by the reference numeral 50. This plug key is rigidly secured to a plate 52 which is fixedly mounted in the station body at the back end of the counterbore 45. The plug key 50 extends forwardly from this plate into the bore 41 in the station body. The plug key is generally cylindrical in outline and is substantially smaller in cross section than the bore 41. The spacing between the periphery of the plug key 50 and the wall of the bore 41 in the station body is such that the front end of the key-lock 11, which includes the tube 15 and the fitting 16, is freely slidable between them. At its front end the plug key is formed at its periphery with nine grooves 53 which are of varying lengths in a direction from front to back. These grooves 53 are spaced apart angularly at 40 degree intervals. Each of these grooves 53 is approximately semi-circular in cross-section, closed at the rear, and open at the periphery of the plug key 50. These grooves 53 are dimensioned and located to receive the respective front tumblers 38 in the key-lock 11.

In operation, when the key-lock is inserted into the station body previously described, the front ends of the front tumblers 38 in the key-lock engage the back walls of the respective grooves 53 in the station plug key. This causes the respective tumbler sets to be forced within the respective key-lock passages to an extent determined by the lengths of the respective grooves 53 in the station key plug.

The station code plug key may be either of two types. In one, the code plug key is intended to coact with the key-lock in such a manner that only the number wheel is held stationary while the key-lock is turned. In the other, the station code plug key is constructed so that both the number and letter wheels are held stationary while the key-lock is turned. Where number wheel operation only is involved, the grooves 53 in the code plug key have a lesser depth than the corresponding recesses in a code plug key designed for both number and letter wheel operation.

For operation of the number wheel only, and referring to FIGURE 6, the sets of tumblers are moved axially or forced inwardly to such an extent that each of the middle tumblers 37 is substantially flush with the front face of the letter wheel 25 and projects partially into an aligned passage 24 in body portion 22 to hold the letter wheel locked thereto. The front tumblers 38 are received partly in the grooves 53 in the code plug key and partly in the number wheel 31, so that the number wheel is held by these tumblers against turning with respect to the station plug key as the remainder of the key-lock is turned. Since the middle set of tumblers 37 are longer than the letter wheel passages 26 and are held flush with the forward face of the letter wheel 25 by the front set of tumblers 38 they project partially into passages 24 of portion 22 against the compression of springs 35 and thereby lock the letter wheel with tube 15. The letter wheel 31 turns in unison with the rest of the key-lock, with the rounded front ends **37*a* of the middle tumblers 37 carried by the letter wheel riding over the rounded back ends 38*b* of the front tumblers 38 and the rear face of the number wheel. Accordingly, with the entire key-lock except the number wheel 31 and the front tumblers 38 having been turned, a new number appears at the window 33**.

When the code plug key is arranged to operate both the number and letter wheels, the front tumblers 38 are axially moved or forced inwardly relative to the key-lock to a slightly less extent than for number wheel operation only. Accordingly, the middle tumblers 37 have their front ends partly received in the corresponding passages 34 in the number wheel 31, with the remainder of each middle tumbler being disposed in the corresponding passage in the letter wheel 25. The rounded front ends of the back tumblers 36 are substantially flush with the rear face of the letter wheel 25. When the key-lock is turned, the front tumblers 38 engaged by the plug key 50 hold the number wheel 31 against turning with respect to key 50, and the middle tumblers 37, which are partly received in the number wheel, hold the letter wheel stationary also. The body portion 22 and tube 15 turn with respect to the letter wheel 25, with the rounded front ends **36*a* of the back tumblers 36** riding over the rear face of the letter wheel to permit such relative movement to take place.

It will be apparent that with the foregoing arrangement, wherein the number wheel has nine positions and each position can have nine combinations with the letter wheel, there are 81 possible combinations of the number and letter wheels for which the individual plug keys at the dummy stations may be designed without any one station duplicating another.

Referring now particularly to FIGURES 4, 5, 6 and 8, the manner of mounting the plug key 50 in the station body 40 and the manner of mounting the key unit at a dummy station will now be described. The plug key 50 at the rear portion thereof has an axial threaded opening adapted to receive a screw 54 and an eccentric recess adapted to receive a pin 56 projecting from the forward face of plate 52 whereby the key is rigidly secured to the plate in a desired position. The stop pins 46 and 47, previously referred to, comprise spacing collars 57 and screws 58 threadedly engaging body 40 and these screws together with a third screw and spacing collar positioned between pins 46 and 47, hold plate 52 rigidly fixed to the keyway body. As best indicated in FIGURE 5, the front face of the plate 52 has spaced numbers stamped therein, the numbers running from 1–9 inclusive and being spaced at 40° intervals. Numbers 1 and 9 are visible through slots 43 and 44 and these numbers aid in properly positioning the plate. An end closure plate 59 is formed with two spaced holes adapted to receive screws 61 whereby it may be secured to an upright panel 62 located at each dummy station. Plate 59 is formed with a forwarding extending circular flange 63 adapted to telescope within an enlarged bore formed at the rear portion of body 49 and engage set screws 64 to rigidly mount the keyway body 49 on panel 62. After the set screws 64 are properly engaged with plate flange 63, they are each sealed by a lead slug which is placed over the set screw and swedged into place with a special sealing tool which leaves a distinctive symbol or mark on the seal. The seal cannot be removed except by drilling or digging out, which will mutilate the seal, thereby showing evidence of tampering.

Referring to FIGURE 6, it will be noted that cylindrical portion 22 is formed with a threaded central opening which receives the large end of a shaft 66, the reduced forward end of the shaft indicated at 67 projects into key passage 30 and forms a bearing for key 28. The letter wheel 25 is fixed to key 28 in any suitable manner as by a screw 68 whereby the key will rotate with the letter wheel to change the angular position of key grooves 29 relative to tube 15. In a manner to be later described, when the grooves 29 disposed at the forward end of key 28 are moved or rotated to a predetermined position, the key acts on a wired transmitter station to actuate mechanism and cause transmission of a signal to a remote central station.

Thus, letter wheel 25 is rotatable relative to tube 15 about shaft portion 67 and number wheel 31 is rotatable to tube 15 about key 28 and independently of the letter wheel. However, it will be noted that any rotation of letter wheel 25 relative to tube 15 must be effected through number wheel 31 since only the forward set of tumblers 38 carried by the number wheel engage the grooves 53 formed in the plug key 50. It will be apparent that if the letter wheel 25 occupies or is moved to B position, as evidenced through window 27 of tube 15, it can have nine different combinations with the number wheel as the number wheel is rotated through 360° by successive engagement with plug keys 50 at different dummy stations. Since this is true for each letter on the letter wheel 25, a large number of dummy stations can be visited without duplication of plug keys 50 or without the same pattern for the key grooves 53. For example, in the embodiment shown wherein both the letter wheel and number wheel have nine different positions, 81 dummy stations can be accommodated. Of course, several wired signal transmitter stations can be disposed at points along the dummy station route since it is merely necessary to rotate the key 28 to a new position for each transmitter station.

The transmitter station will now be described with reference to FIGURES 9–13 inclusive.

*Transmitter Station*

At each transmitter station along the route which the watchman is required to follow, there is provided a conventional signal transmitter which is operated by the insertion and turning of the aforementioned key-lock, provided this station is visited in the proper sequence with respect to the other stations along the route.

At each transmitter station there is provided a keyway body 70 which is generally similar to the keyway body at each of the dummy stations. This keyway body is provided with a cylindrical bore 71 which is open at the front end face 72 of the keyway body. At its back end the bore 71 communicates with a first enlarged cylindrical counterbore 73. At the back end of the keyway body there is provided a second larger counterbore 74 which communicates with the first counterbore 73. The second counterbore 74 is open at the back end of the keyway body.

A pair of slots 75 and 76 are formed in the keyway body at the periphery of the bore 71 therein. These slots extend lengthwise along the keyway body from the front end thereof back to the first counterbore 73. In the embodiment shown, the second slot 76 is located 40 degrees clockwise from the first slot 75, viewed from the front end of the keyway body. The first slot 75 is located in vertical position at the top portion of the keyway body.

At its back end the keyway body is formed with a transverse recess 77 at its periphery which intersects the two counterbores 73 and 74 in the keyway body. The recess 77 is defined by generally vertically extending wall 78 located about 20° beyond the slot 75 on each side of center.

With this arrangement, the key-lock 12 may be inserted into the body 70 with the nose 21 of the key-lock being received in the vertical slot 75. The key-lock is forced lengthwise into the keyway body 70 until the nose 21 of the key-lock reaches the counterbore 73. Then the key-lock may be turned a limited amount in a clockwise direction beyond slot 76 and subsequently in a counterclockwise direction until it is aligned with slot 76. This operation winds and then releases the transmitter mechanism, which causes a one-round "finish" signal to be transmitted. At the start fo the next tour the key-lock is removed, which again releases the transmitter mechanism and causes a one-round "start" signal to be transmitted. The key-lock is set for the first dummy station on the tour when removed from the transmitter.

A stop latch 80 is pivotally mounted in the body recess 77 so as to present a depending finger 81 positioned in the path of movement of the nose 21 of the key-lock as the key-lock is turned after having been inserted in the keyway body. The arrangement is such that the stop latch 80 is pivoted out of the way when the key-lock is turned clockwise from the initially inserted position where its nose 21 is in registration with the slot 75 in the keyway body. However, after the nose of the key-lock has passed beyond the stop latch, the latter drops down and the key-lock cannot be turned in the opposite direction to bring its nose 21 in registration with the keyway slot 75 after it has passed the stop latch. With this arrangement, the only way the mechanism can be operated is to insert the nose of the key-lock into the slot 75 and then turn the key clockwise, as described. It is impossible to insert the key-lock first into the keyway slot 76 and then remove it from the keyway slot 75.

A code plug key 85 is fixedly positioned in the bore 71 in keyway body. This plug key 85 is cylindrical in outline and is of substantially smaller diameter than the bore 71 in the keyway body, so that the front end of the key-lock may be inserted fully into the bore 71 around the plug key. At its front end face, the plug key 85 is formed with 9 evenly spaced recesses 86 at its periphery which are of different depths. These recesses 86 are positioned to receive the front tumblers 38 on the key-lock in the same manner as the code plug key 50 at the dummy station, already described.

The plug key 85 is formed with an axial bore 87 which is open at its front end and extends to an enlarged counterbore 88 which is open at the back end of the plug key. At the intersection between the bore 87 and the counterbore 88 the plug key presents an internal annular shoulder or lip 89.

The plug key 85 is fixedly mounted on a plate 90 which is located at the second counterbore 74 in the keyway body. The plate 90 is generally cylindrical in outline, and is formed with a cutaway peripheral portion 91 having a circumferential extent of approximately 120 degrees. Also, the plate 90 is formed with a central opening receiving the cylindrical portion of a flanged body member 100 which is secured to plate 90 and the plug key 85 by screws 92.

The cylindrical portion of member 100 projects into the counterbore 88 in the code plug. The enlarged rear flange 102 on the member 100 abuts the rear face of plate 90. The front end of the member 100 is spaced rearwardly from the annular lip 89 on the plug key 85.

At its flanged back end the member 100 is formed with a cylindrical recess. Four evenly spaced passages 104 extend lengthwise through the body member 100 from its front end to the recess, each of these passages 104 being open at each end.

Rearwardly of the body member 100 there is a barrel and cam assembly including a barrel member 105 of cylindrical shape whose front end extends into the cylindrical recess in the flange 102 on the body member. The barrel member is formed with four evenly spaced, lengthwise cylindrical passages 106 adapted to register with the passages 104 in the body member 100 and form continuations thereof. Each of the passages 106 is open at the front end of the barrel and is closed at the back end thereof.

An elongated cam member 107 is secured to the barrel member 105, extending perpendicular thereto. This cam member is arranged to initiate the operation of the transmitter in response to turning of the cam member. The cam member 107 carries a forwardly projecting pin 111 which is positioned to be engaged by the nose 21 when the key-lock is turned after having been inserted in the keyway body 70.

Four sets of spring and tumblers are provided for the respective passages 104 and 106 in the body and barrel members. Each of the barrel passages 106 receives a compression coil spring 108 seated at the closed back end of its passage. Each set also includes a back tumbler 109 shaped and dimensioned to be freely slidable in the respective passages 104 and 106. The back tumblers 109 in the respective sets are all the same length. Each set also includes a front tumbler 110 which is slidably received in the corresponding passage 104 in the body member 100. The several front tumblers 110 are of different lengths. Each of the back tumblers 109 is formed with a rounded front end face and each of the front tumblers 110 is formed with a rounded back end face. Each of the front tumblers 110 is longer than the passages 104 in the body member 100.

Figures 9, 10, 11:
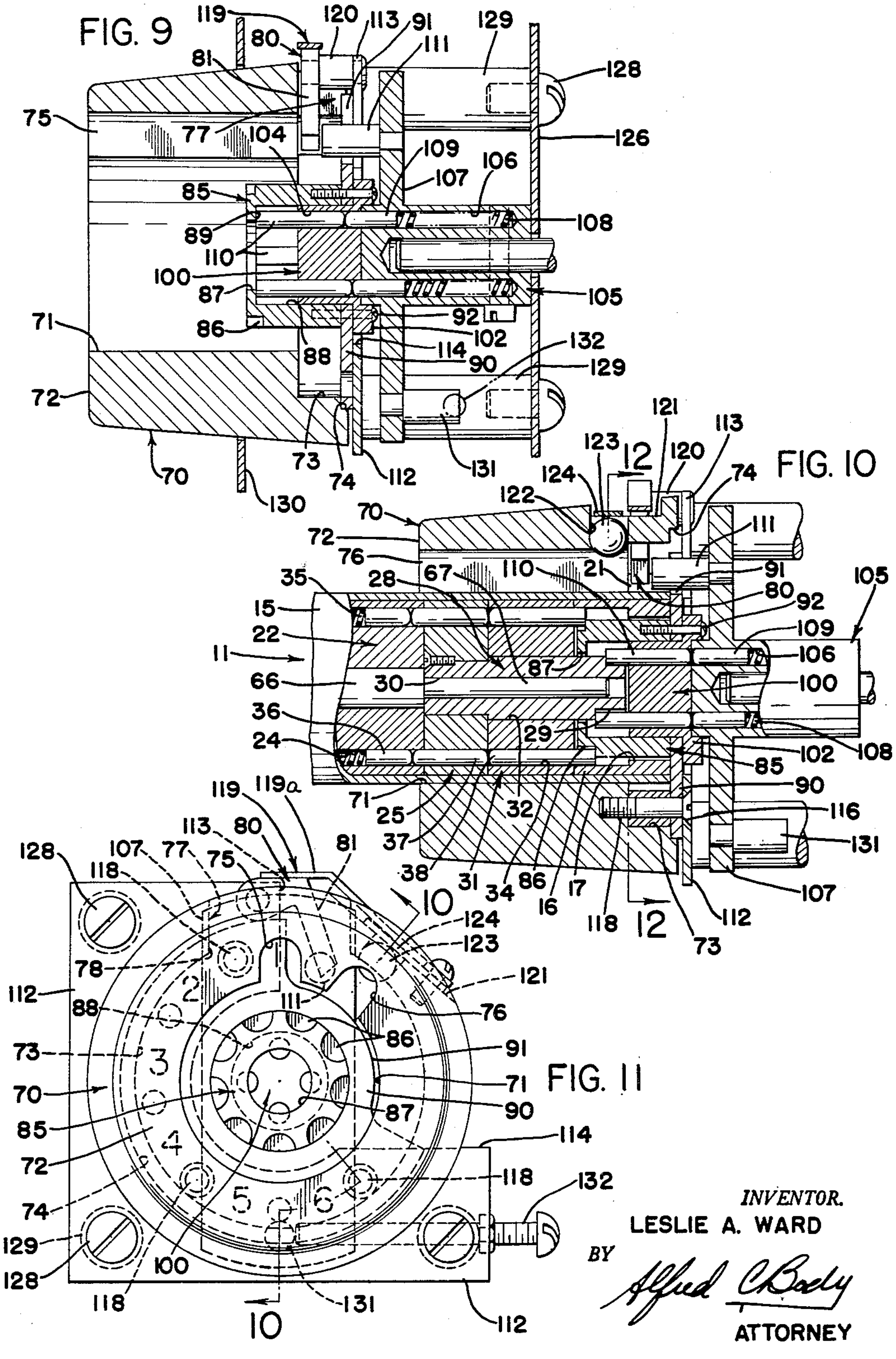
FIGURE 9 is a longitudinal sectional view showing the various parts of the transmitter station.
FIGURE 10 is a longitudinal sectional view showing the key-lock engaged with the plug key at the transmitter station taken on line 10—10 of FIGURE 11.
FIGURE 11 is a front or left end elevational view of the transmitter station shown in FIGURE 9.

Normally, and as shown in FIGURE 9, in the absence of a key-lock inserted in the keyway body, the springs 108 cause the front tumblers 110 to project forwardly beyond the front end of the body member 100 and into engagement with the annular lip 89 on the key 85. The back tumblers 109 are disposed partly in the body member 100 and partly in the barrel member 105.

When the key-lock is inserted into the keyway body, the respective front tumblers 110 seat in the grooves 29 formed in the front end of the key 28 on the letter wheel in the key-lock. The respective front tumblers 110 are forced rearwardly to an extent determined by the depth of these recesses 29. The arrangement is such that when the key-lock is inserted at the transmitter station or into the keyway body 70 in proper sequence, the respective sets of tumblers will be moved longitudinally to such an extent that the back tumbler 109 in each set is completely disposed within the barrel member 105, as shown in FIGURE 10. This movement unlocks the barrel member from body member 100 and enables the barrel member 105 and the cam member 107 to turn with respect to the body member 100. As the key-lock is turned, the nose 21 on the key-lock engages the pin 111 on the cam member 107 causing the cam member and barrel member 105 to turn in unison with the key-lock. During such turning movement of the barrel and cam unit, the rounded front ends of the back tumblers 109 ride over the rounded back end faces of the front tumblers 110 and over the rear face of the body member 100. Such turning movement of the 107 causes it to initiate the operation of the transmitter at that station.

It will be apparent that the operation of this mechanism depends upon the coaction between the key 28 on the letter wheel in the key-lock and the respective sets of tumblers associated with the body member 100 and the barrel and cam unit 105 and 107. Thus, if the angular position of the key 28 does not correspond to the particular arrangement of the tumblers at that transmitter station, which would occur if the watchman were to visit this station out of order, the sets of tumblers would hold the barrel and cam unit locked to member 100 so that the barrel and cam unit could not turn and the key-lock itself could not be turned.

Figures 12, 13:
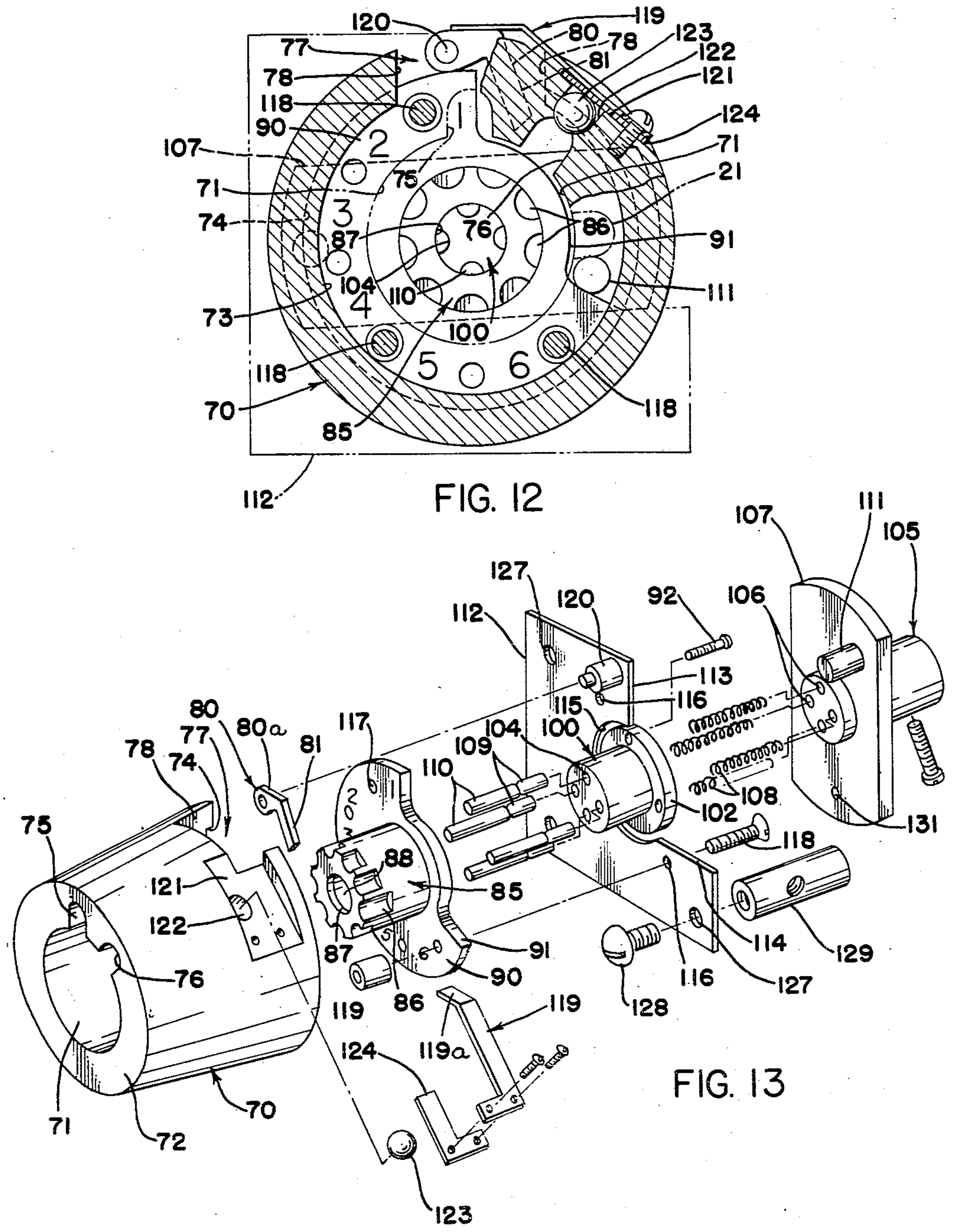
FIGURE 12 is a transverse section taken along the line 12—12 of FIGURE 10 shown in an alternative position with the key-lock removed for purposes of clarity.
FIGURE 13 is an exploded view showing the parts of the transmitter station.

The manner of pivotally mounting the stop latch 80 and supporting the key body 70 and associated parts will now be described. As best illustrated in FIGURE 13, a mounting plate 112 is generally rectangular with the exception of a cutaway peripheral portion including a vertically extending edge 113, a horizontally extending edge 114, and a connecting arcuate edge 115 slightly spaced radially from flange 102 of member 100. Plate 112 abuts the rear face of plate 90 and both plates are formed with a plurality, preferably three, aligned holes indicated at 116 and 117 respectively adapted to receive screws 118. These screws are projected through the plates and threaded into the wall of the keyway body 70. The screw heads are preferably counter-sunk to be flush with the rear face of plate 112. Plate 112 has a forwardly extending and preferably step shouldered pin 120 fixed thereto which forms a bearing for the stop latch 80.

The stop latch is thus free to pivot about pin 120 in the space provided by recess 77 of body 70. To normally hold latch 80 in a downward position, as shown in FIGURE 12, and to limit downward movement thereof, a spring finger 119 is mounted at a flattened area 121 of body 70. The finger has its outer end 119*a* bent to resiliently engage the flat top surface 80*a* of latch 80, whereby the latch will normally be held in a downward position but can be elevated by nose 21 as the key-lock 11 is rotated clockwise.

Also provided at the body area 121 is a cylindrical opening 122 having a partly spherical base which supports a ball 123. The ball normally projects partly into slot 76 forwardly of the circular path of nose 21 of key-lock 11 whereby if the nose is in registry with slot 76, the key-lock cannot be withdrawn without elevating the ball. To insure a firm seat for the ball, a spring finger 124 is mounted at body area 121 to resiliently engage the top surface of the ball. The ball detent prevents accidental withdrawal of the key-lock when it is disposed at the transmitter station or in the body 70 between tours of the watchman. For reasons hereinafter pointed out, a detent for the key-lock is not provided at intermittent transmitter stations.

The plate 112 is adapted to be secured to a mounting member 126, preferably generally U-shaped in horizontal section, which in turn is adapted to be mounted on the back or interior panel (not shown) of a cabinet at the transmitter station. Accordingly, plate 112 is formed with a plurality of holes 127, preferably three, through which screws 128 are projected to threadedly engage one end of mounting and spacing studs 129. The opposite ends of the studs are engaged by similar screws projected through holes in the wall of the mounting member whereby when the mounting member is secured to the cabinet panel the keybody 70 and associated parts described are firmly supported. The studs 129 are of a length to permit the barrel member 105 to turn freely with slight clearance relative to mounting member 126. The barrel member is usually provided with a rearwardly extending shaft which projects through mounting member 126 for actuating the signal transmitting mechanism in a conventional manner as the barrel member and shaft are rotated.

The manner of using key-lock 11 at a transmitter station as described and which is adapted to send a "start"

signal to a remote central station at the beginning of a watchman's tour and to send a "finish" signal to the central station at the completion of the tour will now be explained. Between tours the key-lock remains inserted in the transmitter station with the nose 21 thereof disposed in recess 73 of body 70 and with the nose held in registry with slot 76 of the body by stop latch 80. With the nose in this position, it abuts pin 111 of cam member 107 and holds the pin to the right of the nose as viewed from the front of the transmitter station. At the completion of the previous tour, the signal transmission mechanism, which includes spring means, has been wound by key-lock rotation whereby the cam member 107 is urged to rotate in a counterclockwise direction. Upon the watchman withdrawing the key-lock with the nose thereof passing along slot 76, pin 111 is free to move and the cam member 107 is moved to upright position as shown in FIGURE 11. This movement causes counterclockwise rotation of the barrel member 105 and its shaft and in a conventional manner, causes the transmission mechanism to send a coded signal to the remote central station indicating "start" of the tour. As previously mentioned, the key-lock is withdrawn against the resistance of the detent ball 123.

For limiting counter-clockwise movement of the cam member 107 and adjusting it to proper upright position, a rearwardly extending pin 131 is fixed to the lower portion thereof. This pin is in the path of a transversely extending adjusting screw 132 threadedly supported by one of the lower spacing studs 129.

When the cam member moves to upright position the tumblers 109 in barrel member 105 are brought into registry with tumblers 110 in member 100 and under the influence of springs 108, the tumblers 109 are forced partly into the passages 104 of member 100. The front end of tumblers 110 engage lip 89 of plug key 85 and limit forward movement of the tumblers. The cam member 107 is thereby locked to the plug key 85 through member 100 until it is actuated by the key-lock 11. At this time the key-lock is properly set to be actuated by the first dummy station 12 if this station is visited in accordance with the predetermined tour pattern. As previously explained, if each dummy station is visited in predetermined sequence, the front tumblers 38 of the key-lock 11 will engage the grooves 53 formed in the plug key 50 and as the key-lock is rotated at each dummy station, the number wheel 31 or both the number wheel and the letter wheel 25 will be rotated relative to the key-lock tube 15. Since the key 28 of the key-lock is fixed to letter wheel 25, the key 28 will be moved a new angular position as the letter wheel is rotated. Assuming all the dummy stations 12 are visited according to the route pattern, upon withdrawal of the key-lock from the last dummy station visited, the key 28 and the tumblers 38 of the key-lock will be set to be accepted at the transmitter station. The key-lock is then inserted in the transmitter station or body 70 thereof with the key-lock nose 21 sliding along slot 75 until the nose enters bore 73 in body 70. It will be noted by reference to FIGURE 11 that if the key-lock is inserted with the nose passing along slot 76 rather than along 75 as intended, the key-lock cannot be rotated counter-clockwise for withdrawal through passage of the nose through slot 75. This is because the cam member pin 111 prevents rotary movement of the key-lock nose 21 in a counter-clockwise direction. Upon proper insertion of the key-lock, as shown in FIGURE 10, the tumblers 110 are seated in grooves 29 of key 28 and will have been forced inwardly to an extent whereby the rear tumblers 109 are entirely disposed in barrel member 105 thereby unlocking the cam member 107 and permitting rotation thereof relative to body 70. The key-lock nose 21 will then be disposed in body bore 73 and under stop latch 80. It will be noted by reference to FIGURES 10 and 11 that pin 111 of cam member 107 is in the path of clockwise movement of key-lock nose 21. The key-lock is then rotated clockwise until further movement of pin 111 is prevented by the lower shoulder of the cutaway portion 91 of plate 90. After the nose 21 passes beyond stop latch 80, the latch drops to a position preventing the nose from moving in a counter-clockwise direction beyond registry with slot 76. After the key-lock has been rotated clockwise as far as possible, it is rotated counter-clockwise to bring nose 21 thereof into registry with body slot 76. This rotation of the key-lock and resultant rotation of cam member 107 and barrel member 105 winds the transmitter mechanism and at the same time causes a coded signal to be transmitted to the remote central station indicating "finish" of the watchman's tour. The key-lock 11 then remains inserted in the transmitter station until the start of another tour.

As previously mentioned, the transmitter station unit described is preferably mounted on the interior panel of a cabinet. The cabinet preferably has a hinged door, as indicated at 130 in FIGURE 9, and the forward or nose portion of the keyway body 70 projects through the cabinet door. The door is locked to the cabinet in a manner to guard against tampering.

If the tour is relatively long, it may be desirable to send a signal from one or more intermediate points on the tour route to the remote central station. For this purpose an intermediate transmitter station is provided which is adaped to transmit a single signal as distinguished from the transmitter station already described which is adapted to send both a "start" and "finish" signal. The unit provided at an intermediate transmitter station is essentially the same as the unit described except that the ball stop or detent for the key-lock nose 21 is omitted and the unit is arranged to transmit only one distinctive coded signal designated as "intermediate" signal. In operation, the key-lock 11 is inserted with the nose 21 thereof passing through vertical slot 75 and it is turned clockwise as far as possible and then turned counterclockwise until engaged by the stop latch 80. This operation winds and releases the transmitter mechanism, causing a one-round "intermediate" signal to be transmitted.

At either type transmitter station engagement of the key-lock 11 with the plug key 85 and rotation thereof sets the key-lock for actuation at the next station designated on the route pattern.

As an added safeguard, a special police call transmitter which is identical in appearance to the transmitters customarily visited may be provided at some point on the tour route. In an emergency, this transmitter may be visited and operated with the key-lock 11 to transmit a distinctive coded signal to the central station operator indicating that police assistance is required. For such an emergency transmitter station, the key body is designed so that it is only necessary to insert the key-lock 11 with the nose 21 thereof passing through a vertically disposed slot and then rotate the key-lock and withdraw the same through an angularly disposed slot. This operates the transmission mechanism to send the coded signal. It is not necessary that the key-lock numbers engage grooves on a plug key so that the setting of the key-lock is not altered. Accordingly, the key-lock can be actuated at the next designated station without regard to its use at an emergency signal station.

Obviously, modifications of the embodiments of the invention differing radically from those described would occur to others upon a reading and understanding of this specification, and it is my intention to include all such modifications and alterations insofar as they come within the scope of the appended claims.

I claim:

1. A key-lock having a key element adapted to be moved to a predetermined set position by operative engagement with a plurality of externally positioned keys in accordance with a sequential pattern, each of said plurality of keys having immovable key-lock engaging parts adapted to coact with said key-lock to move said key element to said set position provided said sequential pattern is followed, said key-lock comprising in combination a generally tubular housing rotatable manually, a plurality of sets of axially movable tumblers disposed within the housing, a wheel carrying one set of tumblers and rotatable within the housing, said wheel being connected to said key element so that rotation of said wheel rotates said key element, and engagement with one of said keys effecting axial movement of said tumblers for selectively locking the wheel with the housing.

2. The combination as described in claim 1 and wherein two independently rotatable wheels are disposed within the housing, each wheel carrying a set of tumblers whereby axial movement of the tumblers effected by one of said keys can selectively shift said tumbler between a position wherein both of said wheels can rotate as a unit relative to the housing and a position wherein one of said wheels can rotate independently of the housing while the other of said wheels is locked to the housing.

3. A key-lock having a key element adapted to be moved to a predetermined set position by successive engagement with a plurality of externally positioned keys in accordance with a sequential pattern, said keys being differently formed and each comprising a fixed plug key having peripheral grooves of differing axial length, said key-lock comprising a manually rotatable housing having axially extending tumbler passages therein, two independently rotatable wheels within the housing each having axially extending tumbler passages therein adapted to be aligned with the housing tumbler passages, three sets of axially movable tumblers including a set in the housing passages and a set in the passages of each wheel, one wheel being movable to a plurality of angularly spaced positions due to restraint by the plug keys and tumblers while the housing is being rotated, and the other wheel being movable to a plurality of angularly spaced positions due to restraint by the plug keys and tumblers for each position of said one wheel whereby a relatively large number of keys can contribute in moving said key element to its predetermined set position without duplication of keys.

4. A key-lock adapted to be actuated by a plurality of externally positioned keys to move a key element associated with the key-lock to a predetermined set position, said key-lock comprising a generally tubular housing adapted to engage one of said keys at one end thereof and to be manually rotated relative to said key, a pair of wheels rotatable within the housing, axially movable locking means within the housing operable by said external key, means on said key to shift said locking means between a first position to selectively lock one of said wheels to the housing and another position to permit both wheels to rotate as a unit relative to the housing, a key element within the housing movable to different positions by rotational movement of one of said wheels, and means responsive to engagement of the key-lock with one of said keys and relative rotation therebetween for setting the key-lock in a position for operative engagement with a succeeding key of somewhat modified form.

5. A key-lock having a key element adapted to be moved to a predetermined set position through engagement and relative rotation of the key-lock with a succession of differently formed externally positioned keys, the key-lock comprising a generally tubular housing having a plurality of axially extending tumbler passages formed in one end portion thereof, a pair of wheels rotatable within the housing with each wheel having a plurality of axially extending tumbler passages adapted to be aligned with the housing passages, three sets of axially movable tumblers within the housing including a set in the housing passages and a set in the passages of each wheel, spring means in the housing normally holding said tumblers in a position whereby both wheels are locked with the housing, means responsive to engagement of said key-lock with one of said keys and relative rotation therebetween for moving said tumblers axially, means responsive to the axial position of said tumblers for allowing rotation of one of said wheels or both of said wheels as a unit relative to the housing, and a key element in the housing fixed to one of said wheels whereby the key element can be moved to said predetermined set position through relative rotation of its associated wheel.

6. The combination with a key-lock comprising a generally tubular housing having an external projection at its forward end forming a nose, a rotatable wheel within the housing, tumblers within the housing and accessible at the forward end thereof adapted to normally hold said wheel locked to the housing, and said tumblers being axially movable to unlock said wheel from the said housing, a generally tubular key body adapted to receive said key-lock and having an enlarged recess therein adapted to receive the key-lock nose, said body being formed with angularly spaced and longitudinally extending slots communicating with the recess, a plug key fixed centrally within the body adapted to be received by the key-lock housing, said plug being formed with peripheral grooves adapted to engage and axially move said tumblers to unlocking position, said body slots being adapted to receive said housing nose whereby with the nose in registry with one slot the key-lock may be forced into the key body until its nose reaches the recess and then rotated and withdrawn as its nose registers with another slot, and said movement of the key-lock effecting engagement of the tumblers with the plug key to unlock said wheel and hold the same against rotation as the key-lock is rotated.

7. A key-lock comprising a body having angularly spaced longitudinally extending tumbler passages therein, a rotatable member within the body, a plurality of longitudinally movable tumblers carried by the rotatable member and body normally locking said member to the body, a plug type of key engageable with said tumblers for longitudinally moving said tumblers to unlock the member from the body whereby the body and member may be relatively rotated, means responsive to disengagement of said key from said tumblers for locking the member to the body in a new angular position, and a signal operating key in the body movable by relative rotation of said member and body.

8. The key-lock as described in claim 7 and wherein spring means are provided in the body normally holding the tumblers in a position locking the member to the body.

9. A key-lock comprising a body having angularly spaced longitudinally extending tumbler passages therein, a plurality of rotatable members within the body, a plurality of longitudinally movable tumblers carried by the rotatable members and body and normally locking said members to the body, a plug type of key engageable with said tumblers for longitudinally moving said tumblers to unlock certain of said members from the body whereby the body and an unlocked member may be relatively rotated, means responsive to disengagement of said key from said tumblers for locking said member to the body in a new angular position, and a signal operating key in the body movable by relative rotation of one of said members.

10. A tour-key comprising a casing having first axially extending passages arranged in a circular pattern, a member rotatably mounted in said casing and having second axially extending passages adapted to be aligned with said first passages in a variety of angular positions of said member with respect to said casing, a first set of tumblers in said first passages and adapted to extend into said second passages to lock said member from rotation with respect to said casing, a second set of tumblers in said second passages and adapted to extend axially outward from said member, means for preventing said second set of tumblers from being removed from said second passages, means biasing said first set of tumblers against said second set of tumblers, at least some of said tumblers of said second set having substantially different lengths so that engagement of said second set of tumblers with a selected externally positioned key will force said first tumblers into a non-locking position with respect to said member and means on said member for holding said member from rotation with respect to said external key when said second tumblers are in engagement therewith whereby rotation of said casing rotates said member with respect to said casing.

References Cited in the file of this patent

UNITED STATES PATENTS

| | | |
|---|---|---|
| 447,062 | Noyes | Feb. 24, 1891 |
| 2,009,640 | Stone | July 30, 1935 |
| 2,019,399 | Deutsch | Oct. 29, 1935 |
| 2,220,937 | Machinist | Nov. 12, 1940 |
| 2,637,844 | Thompson | May 5, 1953 |
| 2,667,785 | Opocensky | Feb. 2, 1954 |